(12) United States Patent
Higuma

(10) Patent No.: US 7,883,281 B2
(45) Date of Patent: Feb. 8, 2011

(54) CAMERA BODY, INTERCHANGEABLE LENS, AND CAMERA SYSTEM INCLUDING CAMERA BODY AND INTERCHANGEABLE LENS

(75) Inventor: Kazuya Higuma, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 12/184,891

(22) Filed: Aug. 1, 2008

(65) Prior Publication Data

US 2009/0060486 A1    Mar. 5, 2009

(30) Foreign Application Priority Data

Aug. 28, 2007    (JP)    ............... 2007-221296

(51) Int. Cl.
G03B 17/14    (2006.01)
(52) U.S. Cl. ..................................... 396/529
(58) Field of Classification Search .............. 396/71, 396/529, 530; 359/827
See application file for complete search history.

(56) References Cited

U.S. PATENT DOCUMENTS

| | | | | |
|---|---|---|---|---|
| 5,257,058 A | * | 10/1993 | Mabuchi | 396/71 |
| 5,278,604 A | * | 1/1994 | Nakamura | 396/71 |
| 5,434,637 A | * | 7/1995 | Ohta | 396/529 |
| 5,455,650 A | * | 10/1995 | Fujiwara | 396/71 |
| 5,731,920 A | * | 3/1998 | Katsuragawa | 359/827 |
| 5,877,811 A | * | 3/1999 | Iijima et al. | 348/375 |
| 5,956,531 A | * | 9/1999 | Kawabe et al. | 396/62 |
| 6,947,092 B1 | * | 9/2005 | Nagata et al. | 348/360 |
| 7,619,661 B2 | * | 11/2009 | Takahashi et al. | 348/224.1 |

FOREIGN PATENT DOCUMENTS

| JP | 63199335 A | * | 8/1988 |
|---|---|---|---|
| JP | 04-273225 A | | 9/1992 |

* cited by examiner

Primary Examiner—Clayton E Laballe
Assistant Examiner—Leon W Rhodes
(74) Attorney, Agent, or Firm—Canon USA, Inc. IP Division

(57) ABSTRACT

An interchangeable lens system includes an interchangeable lens capable of communication between the interchangeable lens and a camera body. The interchangeable lens includes a camera identifying unit that identifies a camera body from information obtained by the communication between the interchangeable lens and the camera body. In response to a data transmitting request instruction transmitted from the camera body through the communication, the camera identifying unit converts reply data into a format adapted for the camera body on the basis of an identifying result of the camera identifying unit, and transmits the reply data.

2 Claims, 4 Drawing Sheets

CAMERA BODY, INTERCHANGEABLE LENS, AND CAMERA SYSTEM INCLUDING CAMERA BODY AND INTERCHANGEABLE LENS

BACKGROUND OF THE INVENTION

1. Field of the Invention

The present invention relates to a camera body, an interchangeable lens, and a camera system including the camera body and the interchangeable lens. More specifically, the present invention relates to a technology for communication between the camera body and the interchangeable lens.

2. Description of the Related Art

A camera system including a camera body and an interchangeable lens is known.

In addition, a camera system is known in which information regarding an inside of an interchangeable lens is transmitted to a camera body and the camera body controls the interchangeable lens by transmitting, to the interchangeable lens, instructions to drive an aperture and lenses in the interchangeable lens on the basis of the information.

Regarding the camera system, in a case where a new interchangeable lens provided with a new function that an existing interchangeable lens does not have is sold, even if the new interchangeable lens is connected to an existing camera body, the new interchangeable lens needs to operate normally. In addition, regarding even a new camera body for the new function, an existing interchangeable lens needs to operate normally when connected to the new camera body.

Accordingly, communication specifications, instructions, etc., between the camera body and the interchangeable lens comply with those that are known. In addition, it is necessary to add specifications and instructions for further new functions.

As communication specifications and instructions are increased whenever a new function is added, the number of instructions is increased. As a result, there is a possibility that 256 types of instructions that can be defined by 8 bits in ordinary serial communication may be insufficient.

In this case, it is necessary to use 16 bits to define instructions. However, another problem occurs in that communication time is increased.

In addition, there is a possibility that data received from a new interchangeable lens may be incorrectly used in an existing camera body.

In this case, it is preferable that the existing camera body, which has a problem, be modified. However, it is difficult to modify the existing camera body because it has already been sold. Accordingly, in many cases, data that may be incorrectly used in an existing camera body is not stored in a new interchangeable lens, and, even in a camera body of a newer model, functions of the camera body are not used. In this case, the number of instructions that can be used decreases, so that the interchangeable lens cannot comply with a new function or performance.

To solve the above problems, Japanese Patent Laid-Open No. 04-273225 discloses the following technology.

In a case where an interchangeable lens for a single-lens reflex camera body is used for a video camera body with interchangeable lenses, even if both are connected to each other by using an adapter capable of mechanical conversion, the interchangeable lens cannot be controlled. This is because the single-lens reflex camera and the video camera completely differ in lens control method.

Accordingly, an adapter is needed that converts data from the interchangeable lens into a format necessary for the video camera body, and that conversely converts a control signal from the video camera body into a format necessary for the interchangeable lens.

However, for the same camera system, connection by using an adapter or the like is not preferable since an optical system is changed and size is increased.

SUMMARY OF THE INVENTION

The present invention provides a camera system in which a new function is added without using an adapter and without greatly changing communication specifications. The present invention also provides a camera system capable of maintaining compatibility between each of new and old camera bodies and each of new and old interchangeable lenses.

According to an aspect of the present invention, there is provided an interchangeable lens interchangeably connectable to a camera body among a plurality of camera bodies, the interchangeable lens including a communication unit, a camera identifying unit configured to identify the camera body from camera information received from the camera body via the communication unit, and a control unit configured to control communication with the camera body. In response to a data transmitting request transmitted from the camera body, the control unit performs conversion of transmission data to be transmitted to the camera body on the basis of a result of identification by the camera identifying unit, and transmits the converted data.

Further features of the present invention will become apparent from the following description of exemplary embodiments with reference to the attached drawings.

DESCRIPTION OF THE EMBODIMENTS

Various embodiments, features and aspects of the present invention will be described below with reference to the accompanying drawings.

First Exemplary Embodiment

Figure 1:
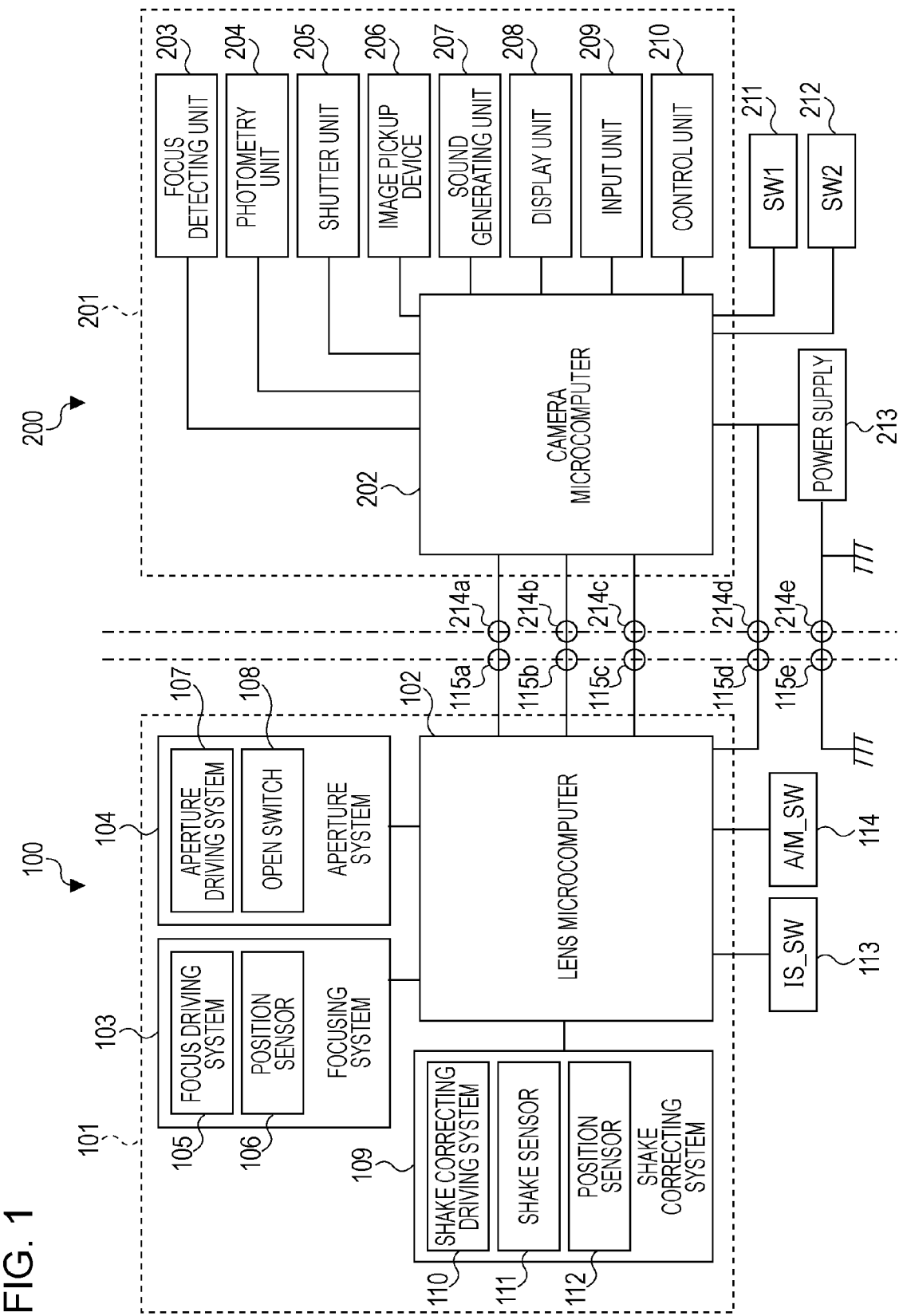
FIG. 1 is a block diagram showing an electric configuration of an example camera system according to an exemplary embodiment of the present invention.

FIG. 1 is a block diagram showing a circuit configuration of a camera system according to a first embodiment of the present invention.

Figure 4:
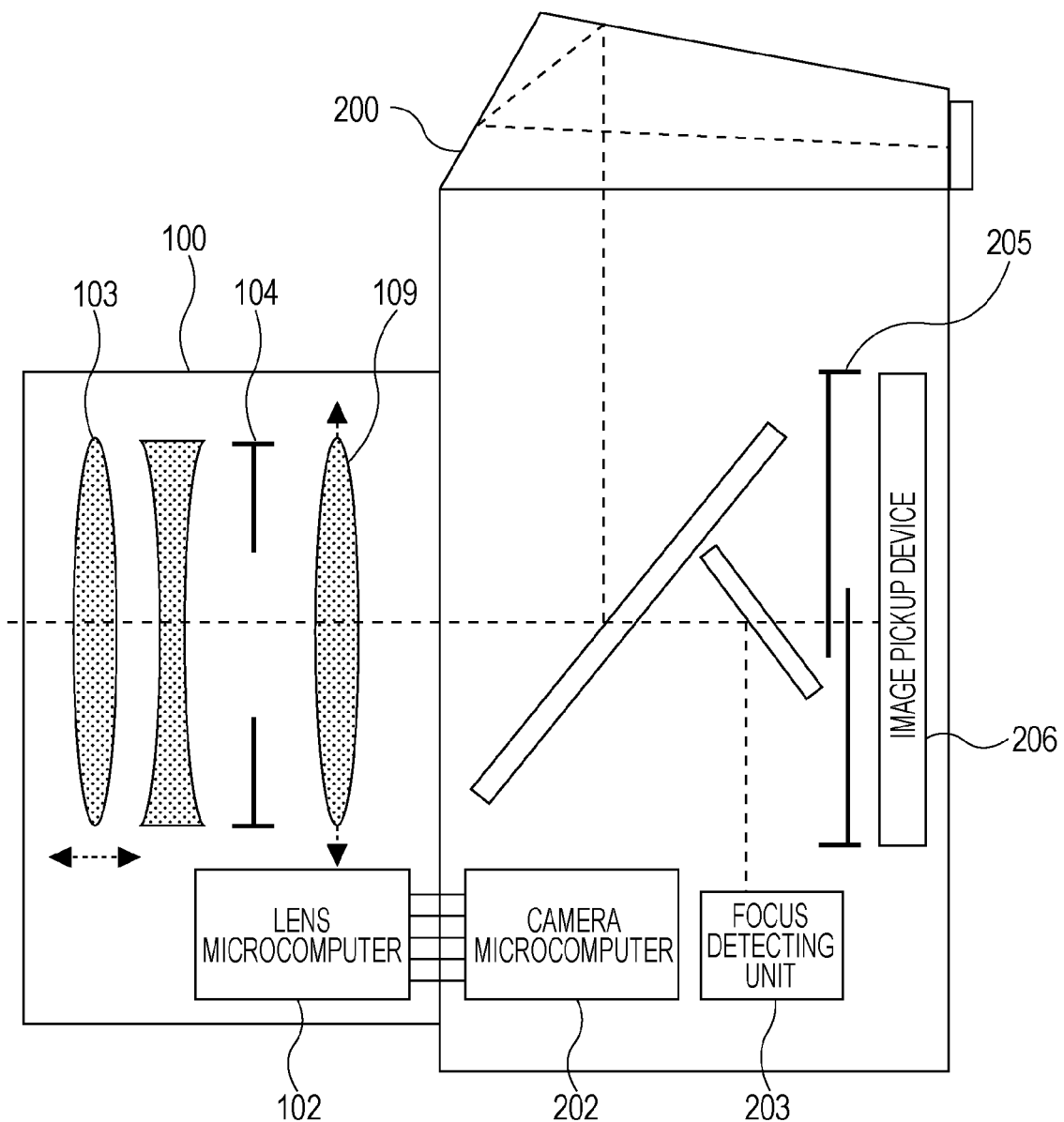
FIG. 4 is a block diagram showing a schematic side perspective of the camera system shown in FIG. 1.

FIG. 4 is a block diagram showing a schematic side perspective configuration of the camera system shown in FIG. 1. Blocks identical to those in FIG. 1 are denoted by identical reference numerals. The first embodiment of the present invention will be described on the basis of FIGS. 1 and 4.

FIG. 1 includes a block diagram of an interchangeable lens 100 and a block diagram of a camera body 200. In the interchangeable lens 100, a lens microcomputer 102 can perform communication via a communication contact 115a for a clock signal, a communication contact 115b for signal transmission from the camera body 200 to the interchangeable lens 100, and a communication contact 115c for signal transmission from the interchangeable lens 100 to the camera body 200.

On the basis of instructions transmitted from the camera body 200, operations of a shake correcting system 109, a focusing system 103, and an aperture system 104 that have the configurations shown in FIG. 1 are executed. The shake correcting system 109 includes a shake sensor 111 for detecting a shake and a position sensor 112 for detecting a displacement of a compensation lens (not shown).

In addition, the lens microcomputer 102 generates a control signal on the basis of outputs of the shake sensor 111 and the position sensor 112. The control signal is supplied to a shake correcting driving system 110, and the shake correcting driving system 110 drives the compensation lens.

In addition, an image stabilizing switch 113 is used to select whether to activate a shake correcting operation. When the shake correcting operation is selected, the image stabilizing switch 113 (indicated by "IS_SW" in FIG. 1) is turned on.

The focusing system 103 includes a focus driving system 105 for driving a focus adjusting lens (not shown) and a position sensor 106 for detecting the position of the focus adjusting lens. The focusing system 103 performs focusing in response to a command from the lens microcomputer 102 by driving the focus adjusting lens.

In addition, an auto focus (AF) switch 114 (indicated by "A/M_SW" in FIG. 1) is used to select a focusing operation. In the case of performing automatic focus adjustment, the AF switch is set to AUTO.

The aperture system 104 includes an aperture driving system 107 for driving an aperture (not shown) and an open switch 108 for detecting whether the aperture is open. In response to a command value from the lens microcomputer 102, the aperture is closed to a set position or returned to an open state.

The lens microcomputer 102 transmits the in-lens state, including information such as a focus position and an aperture value, and lens-related information, such as an open aperture value, a focal length, and data necessary for focus detecting calculation, to the camera body 200 via the communication contacts.

The lens microcomputer 102, the focusing system 103, the aperture system 104, and the shake correcting system 109 are included in a lens electric system 101.

A power supply 213 in the camera body 200 supplies power to the lens electric system 101 via a power-supply contact 115d and a ground contact 115e.

In addition, an electric system 201 in the camera 200 body includes a focus detecting unit 203 and a photometry unit 204. The electric system 201 also includes a shutter unit 205 for determining an exposure time for an image pickup device 206 such as a complementary metal-oxide semiconductor (CMOS) sensor, and a sound generating unit 207 for emitting a warning tone or the like.

The electric system 201 also includes a display unit 208 that displays various types of camera body information, an input unit 209 by which a user inputs information, and a control unit 210 for performing other control.

The camera body 200 includes a camera microcomputer 202 for performing starting of operation of each unit, termination management, exposure calculation, focus detecting calculation, etc. In the camera body 200, the electric system 201 is supplied with power also from the power supply 213.

The camera body 200 includes a switch 211 (indicated by "SW1" in FIG. 1) for starting a photometry operation and focus detection, and a switch 212 (indicated by "SW2" in FIG. 1) for executing release operation (starting photographing).

These switches are commonly formed by a two-stage stroke switch. A first stroke of a release button turns on the switch 211, and a second stroke of the release button turns on the switch 212.

The camera body 200 also includes an electric contact 214a for a clock signal, an electric contact 214b for signal transmission from the camera body 200 to the interchangeable lens 100, and an electric contact 214c for signal transmission from the interchangeable lens 100 to the camera body 200. The camera body 200 also includes a power-supply contact 214d and a ground contact 214e for power supply.

Figure 2:
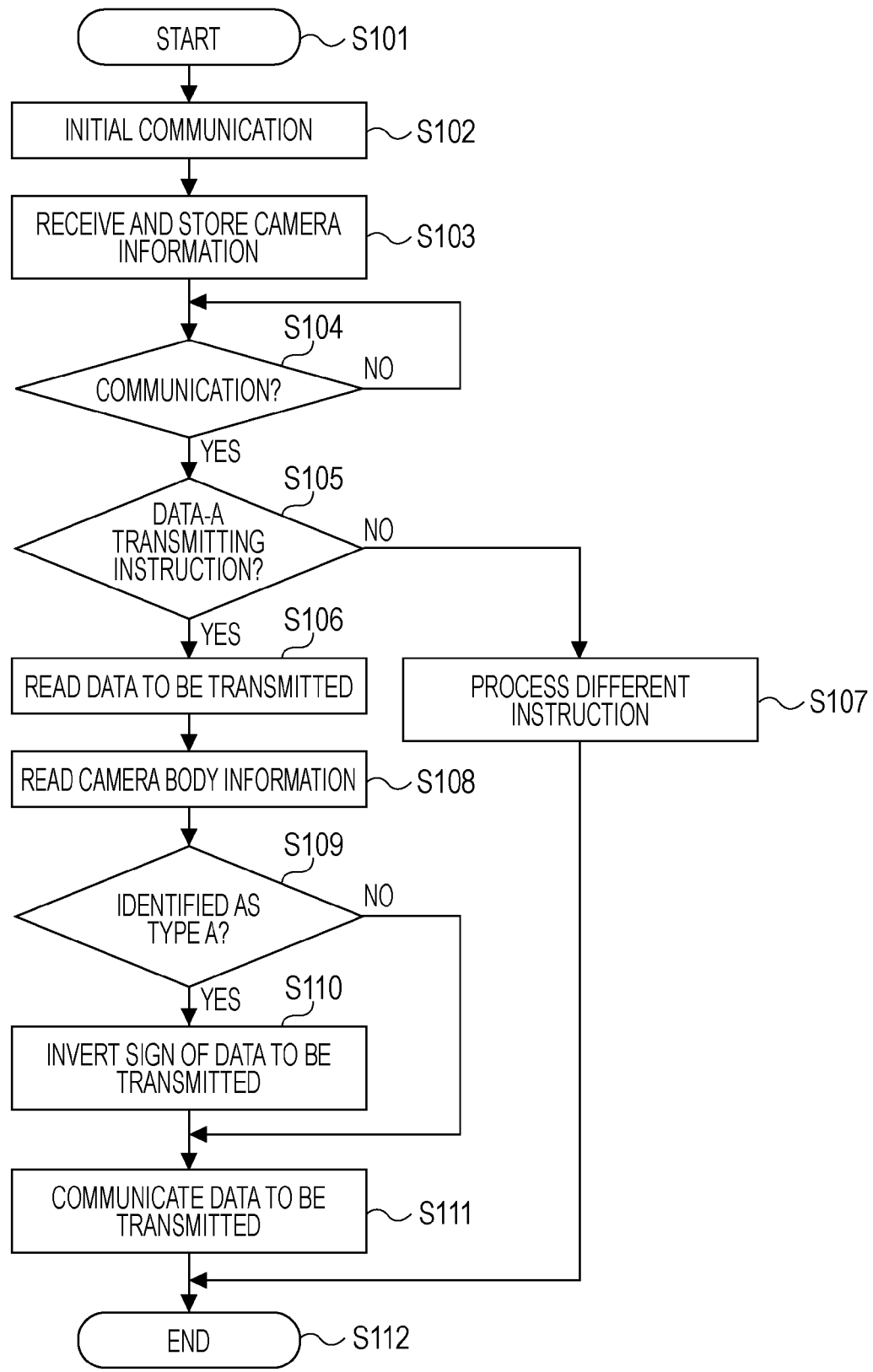
FIG. 2 is a flowchart showing an example operation of an interchangeable lens in the embodiment.

FIG. 2 is a flowchart showing an operation of the lens microcomputer 102 shown in FIG. 1.

When the interchangeable lens 100 is mounted on the camera body 200, the power supply 213 in the camera body 200 starts supplying power to the interchangeable lens 100. Then, the process of the flowchart is started (step S101).

In step S102, initial communication is performed between the camera body 200 and the interchangeable lens 100. The communication is performed via the above contact by using an 8-bit serial communication method. An instruction is sent from the camera body 200, and the interchangeable lens 100 performs an operation in accordance with the instruction.

In step S103, the lens microcomputer 102 receives camera body information for identifying a camera body via a communication means, and stores the camera body information in a storage area in the lens microcomputer 102 in order for the camera body information to be used in the following step S108.

In step S104, the lens microcomputer 102 is in a standby mode awaiting a communication signal from the camera body 200, and proceeds to step S105 upon reception of a communication signal.

In step S105, the lens microcomputer 102 determines whether or not the communicated present instruction is a data-A transmitting instruction. Normally, instructions are represented by 8 bits. Accordingly, up to 256 instructions can be represented by 8 bits.

The instructions include, in addition to the data transmitting request, an instruction for driving each actuator in the interchangeable lens 100, and a data receiving request for receiving data transmitted from the camera body 200. The interchangeable lens 100 identifies these instructions. In accordance with the result of identification, when the instruction is the data-A transmitting instruction, the lens microcomputer 102 proceeds to step S106. When the instruction is an instruction other than the data-A transmitting instruction, the lens microcomputer 102 proceeds to step S107.

In step S107, an operation of processing an instruction other than the data transmitting instruction is performed. Description of this operation is omitted since it is not directly related to the present invention.

If the lens microcomputer 102 has received the data-A transmitting instruction, in step S106, data to be transmitted to the camera body 200 is read from the storage area in the lens microcomputer 102.

Next, in step S108, the lens microcomputer 102 reads the camera body information stored in step S103.

In step S109, the lens microcomputer 102 identifies the type of the camera body 200 on the basis of the read camera body information. When the type of the camera body 200 is type A, the lens microcomputer 102 proceeds to step S110. When the type of the camera body 200 is another type, the lens microcomputer 102 proceeds to step S111. Here, the type-A camera body is a camera body in which a certain function does not correctly operate if data to be transmitted in accordance with the present instruction is processed so that the data is inverted in sign compared with data to be transmitted to a different type of camera body.

Therefore, in step S110, the lens microcomputer 102 performs processing that inverts the sign of the data to be transmitted.

In step S111, the lens microcomputer 102 communicates the data to be transmitted, and finishes the process (step S112) shown in FIG. 2. As described above, according to the interchangeable lens 100 in this embodiment, when certain data is to be transmitted to the camera body 200, the camera body 200 is identified and the sign of data to be transmitted is inverted so that a certain function correctly operates.

As described above, according to the interchangeable lens 100 in this embodiment, when certain data is to be transmitted, a camera to which the interchangeable lens 100 is connected is identified, and, when the camera is identified as a specified camera, the sign of the data is inverted. Subsequently, the data is transmitted.

Accordingly, data can be correctly used in all camera bodies on which the interchangeable lens 100 in this embodiment can be mounted. Therefore, in a type of existing camera, functions that would otherwise be limited resulting in data being incorrectly used become able.

Second Exemplary Embodiment

Next, a second embodiment of the present invention will be described below.

Figure 3:
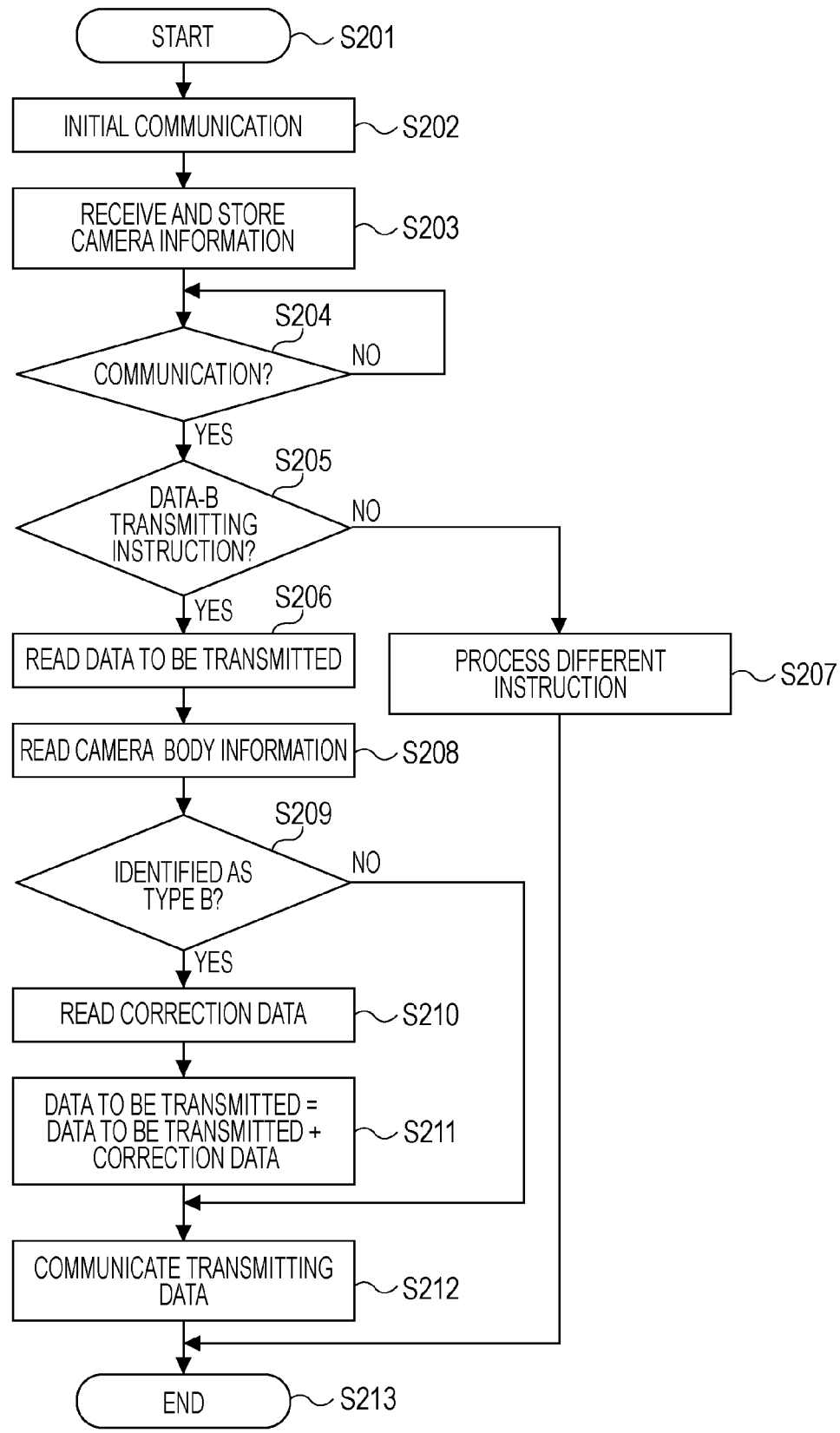
FIG. 3 is a flowchart showing another example operation of an interchangeable lens in the embodiment.

FIG. 3 is a flowchart showing an operation in the second embodiment. The operation will be described in accordance with this flowchart. Similarly to the first embodiment, the configuration of a camera system according to the second embodiment is similar to that shown in FIGS. 1 and 4. In addition, an operation from steps S201 to S204 is identical to that from steps S101 to S104 shown in FIG. 2. Accordingly, its description is omitted.

In step S205, the lens microcomputer 102 determines whether or not the present communication instruction is a data-B transmitting instruction. Here, the data-B transmitting instruction has been prepared.

If the present instruction is a data-B transmitting instruction, the lens microcomputer 102 proceeds to step S206. If the present instruction is another instruction, the lens microcomputer 102 proceeds to step S207.

In step S207, the lens microcomputer 102 performs an operation of processing an instruction other than the data transmitting instruction. Since this operation is not directly related to the present invention, its description is omitted.

In step S206 in the case of receiving the data transmitting instruction, data to be transmitted to the camera body 200 is read from the storage area in the lens microcomputer 102.

In step S208, the lens microcomputer 102 reads the camera body information stored in step S203.

In step S209, the lens microcomputer 102 identifies the type of the camera body 200 on the basis of the read camera body information. When the type of the camera body 200 is type B, the lens microcomputer 102 proceeds to step S210. When the type of the camera body 200 is another type, the lens microcomputer 102 proceeds to step S212. Here, the type-B camera body is a camera body in which a function higher than that of a camera body other than the type-B camera body can be realized by adding correction data to the data to be transmitted in accordance with the present instruction. Accordingly, in step S210, the correction data is read from the storage area of the lens microcomputer 102. In step S211, the correction data is added to the data to be transmitted.

In step S212, the lens microcomputer 102 transmits the resultant data to the camera body 200, and finishes the process (step S213) shown in FIG. 3.

As described above, according to the interchangeable lens 100 in the second embodiment, in a case where certain data is to be transmitted in accordance with a prepared communication instruction, a camera body is identified. When the camera body is identified as a specified camera body, correction data is added to the data to be transmitted, and the resultant data is transmitted. Accordingly, functions can correctly operate in all camera bodies on which an interchangeable lens of a new type in this embodiment can be mounted. The performance of a specified camera body can be enhanced by receiving and using converted data. Further, since a communication instruction has been prepared, compatibility with past models can also be maintained.

The present invention has been described by using two embodiments. By increasing the number of camera bodies that can be identified, the two embodiments can be realized at the same time.

In addition, regarding conversion of data to be transmitted, sign inversion and correction data addition have been described. However, the conversion of the data is not limited thereto. For example, for each identified camera body model, different data can be read.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-221296 filed Aug. 28, 2007, which is hereby incorporated by reference herein in its entirety.

What is claimed is:

1. An interchangeable lens interchangeably connectable to a camera body among a plurality of camera bodies, the interchangeable lens comprising:
   a communication unit configured to communicate with the camera body by performing serial communication with the camera body;
   a camera identifying unit configured to identify the camera body from camera information received from the camera body via the communication unit; and
   a control unit configured to control communication with the camera body,
   wherein, in response to a data transmitting request transmitted from the camera body, the control unit performs conversion of transmission data to be transmitted to the camera body based on a result of identification by the camera identifying unit, and transmits the converted transmission data, wherein the conversion of the transmission data is performed by reading correction data to be added to the transmission data from a storage area in the control unit and adding the correction data to the transmission data.

2. A camera system comprising:
   an interchangeable lens interchangeably connectable to a camera body among a plurality of camera bodies, the interchangeable lens including:
      a communication unit configured to communicate with the camera body by performing serial communication with the camera body,
      a camera identifying unit configured to identify the camera body from camera information received from the camera body via the communication unit, and a control unit configured to control communication with the camera body, wherein, in response to a data transmitting request transmitted from the camera body, the control unit performs conversion of transmission data to be transmitted to the camera body based on a result of identification by the camera identifying unit, and transmits the converted transmission data, wherein the conversion of the transmission data is performed by reading correction data to be added to the transmission data from a storage area in the control unit and adding the correction data to the transmission data; and a camera body configured to communicate with the interchangeable lens, and transmit camera-body identification information and a data transmitting request to the interchangeable lens.

* * * * *